United States Patent Office 3,443,207
Patented May 6, 1969

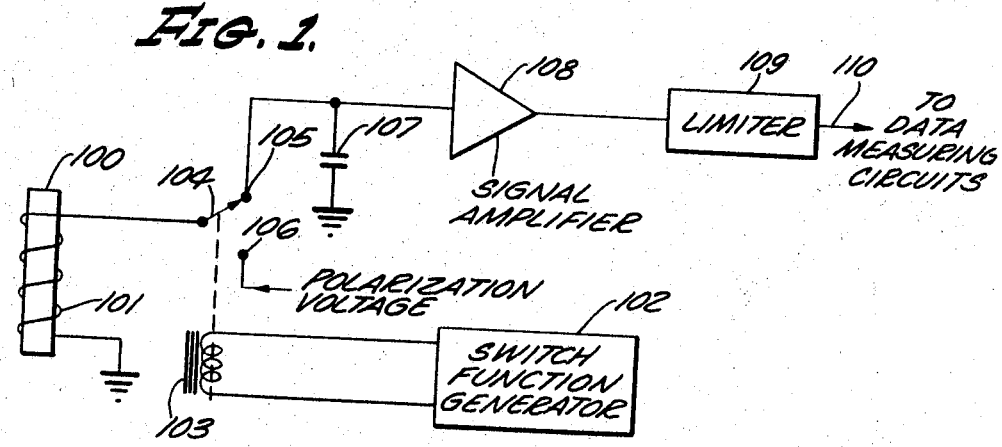
FIG. 1.
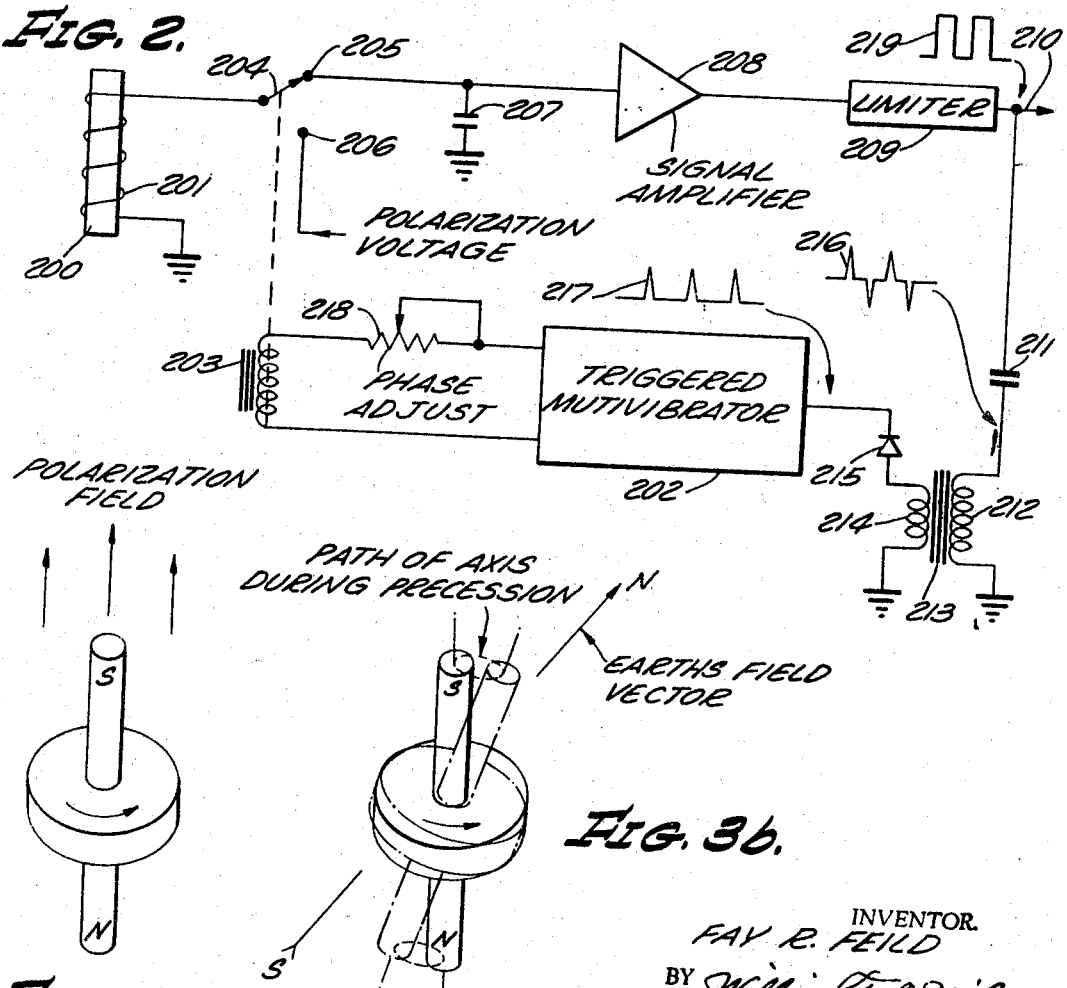
FIG. 2.
FIG. 3a.
FIG. 3b.
INVENTOR.
FAY R. FEILD
BY William T. O'Nail
AGENT INVENTOR.
FAY R. FEILD
BY William F. O'Neil
AGENT

---

3,443,207
PROTON PRECESSION MAGNETOMETER WITH IMPROVED MEANS FOR POLARIZATION AND LARMOR FREQUENCY DETERMINATION
Fay R. Feild, Los Angeles, Calif., assignor to Treasure Salvors, Inc., Vero Beach, Fla., a corporation of Florida
Filed Dec. 2, 1965, Ser. No. 511,066
Int. Cl. G01r 27/72
U.S. Cl. 324—.5                                      2 Claims

ABSTRACT OF THE DISCLOSURE

The improvements to a proton precession magnetometer which are described and disclosed comprise two basic techniques, these being identified as (1) synchronous polarization and (2) a phase coherent reference oscillator for continuous Larmor frequency determination. The syncronous polarization technique and instrumentation are based on the recognition that the polarization cycle which precedes each "read" cycle can be accomplished in less time and with less power if the polarization field is applied when the precessing protons are most nearly at the instantaneous position of initial polarization, an orientation to which they return instantaneously during each cycle of precession. The coherent reference oscillator is based on the concept of continuous Larmor frequency readability. Through a unique arrangement, the reference oscillator runs continuously and is cyclically phase corrected in accordance with a cyclical comparison of the Larmor frequency being detected and the "remembered" frequency of the oscillator. Ancillary techniques disclosed relate to optimum trigger and synchronizing signal development and inductive fly-back absorption.

---

This invention relates to sensitive magnetometers which rely on the phenomenon of proton precession under the influence of a magnetic fluid to be measured.

More particularly, this invention relates to improvements in the proton precession magnetometer which increase its speed of operation, internal power efficiency and portability, whereby it is more adaptable for use as a moving magnetic anomaly detector.

In the prior art, several versions of the proton precession magnetometer exist. U.S. patent reissue number Re. 23,769 (R. H. Varian) describes a system for utilizing the proton precession property to measure magnetic fields accurately and over a large range of intensities. The aforementioned U.S. patent contains a comprehensive theoretical background from which the reader can familiarize himself with the theory of operation as it relates to the instrumentation required to exploit the phenomenon of proton precession.

Another U.S. patent, Number 3,070,745, carries the instrumentation a substantial step farther in providing a design for obtaining readings proportional to field strength.

The present invention makes use of the general two cycle concept prevalent in prior art units, i.e. the device alternately applies a polarizing field for a first half cycle through a magnetizing coil about the proton sample and "listens" or reads during a second half cycle. It is during the second half cycle that the precession frequency signal occurs in response to the field to be measured. Polarization is accomplished in a direction normal to the field to be measured and precession occurs in response to the quadrature field to be measured in such a way that the polarizing coil is adapted to also function as a pick-up coil to receive the precession signal. As pointed out by Varian in the aforementioned patent (Re. 23,769), the precessing protons generate a rotating magnetic field of their own which is induced into the pick-up coil during the said second half-cycle.

It is though unnecessary to discuss basic proton magnetometer theory in any depth since the aforementioned U.S. patents and other references in the technical literature provide an adequate background in this connection.

Certain disadvantages have been found to exist in connection with prior art instrumentations. For example, the strength of the precession signal varies from read-to-read due to several effects, including random polarization effectiveness. Also, there is substantial read time loss due to prior art methods of evaluating the precession frequency. The present invention contemplates the use of a new concept in synchronous polarization to eliminate read signal variations resulting from random depolarization effects and to obtain a power efficiency advantage, increased sensitivity (improved signal-to-noise ratio) and increased overall measurements data rate.

It is also an advantageous feature of the present invention that a heretofore unused fraction of the available read time is regained through introduction of a phase-coherent reference oscillator.

The present invention will be seen to include an improved polarization current break or keying technique as an additional novel feature. Functionally associated with the polarization current decay is yet another feature of the present invention. This feature relates to a triggering technique whereby a discrete beginning for the read half-cycle may be selected for optimum utilization of the available precession signals.

The improvements above referenced and their functional relationship to each other and to the overall magnetometer operation will be apparent as the description proceeds.

In describing the present invention drawings are provided as follows:

FIGURE 1 is a simplified block diagram of the essential elements of a simple prior art proton precession magnetometer.

FIGURE 2 is a block schematic illustrating the simplified instrumentation of the synchronous polarization feature of the present invention.

FIGURES 3a and 3b depict a gyroscopic top analogy to the precessing proton.

Figure 4:
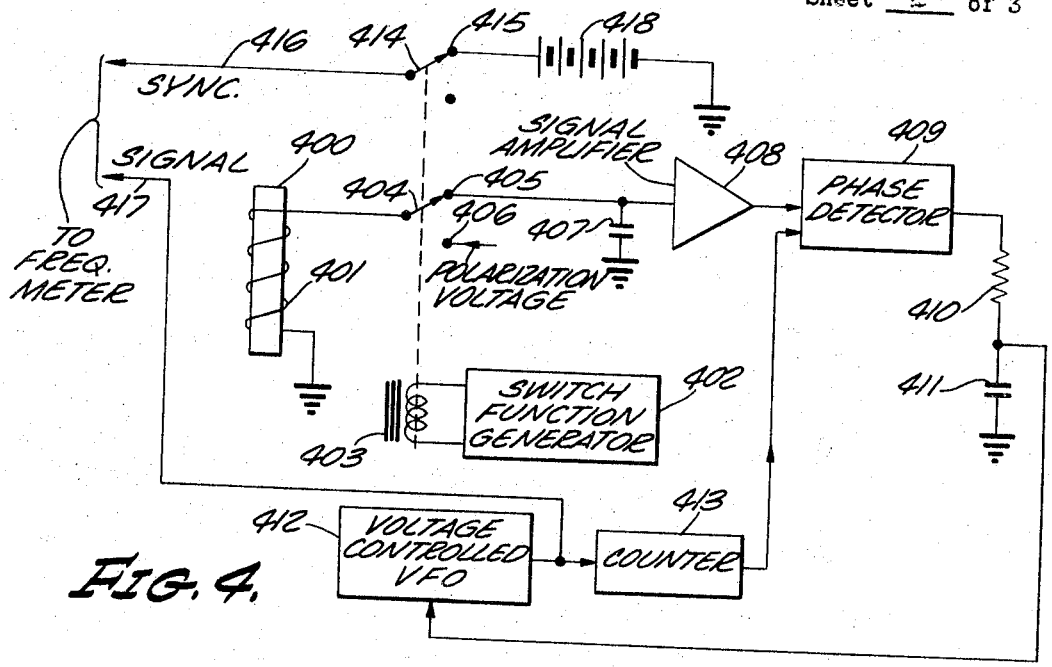
FIGURE 4 is a prior art form of magnetometer phase lock system.

For background in placing the various features and aspects of the present invention into context with respect to the prior art it is thought desirable to review the basic elements of a prior art proton precession magnetometer.

Referring now to FIGURE 1 (a simplified prior art device), a proton sample 100 is shown within a coil 101. This coil serves two purposes, first to supply the magnetic field for polarizing the protons in the sample 100 and thereafter as a pick-up coil to read the alternating signal induced therein by the rotating magnetic field associated with the precessing protons. The signal thus generated in coil 101 is variable in frequency as a direct function of the strength of the magnetic field to be measured, as is known. The frequency of this signal, often referred to as the Larmor frequency, is of the order of 2000 cycles per second when the typical hydrogen proton sample is allowed to precess in the earth's field. A switch function generator or timing signal generator 102 operates to alternately energize and deenergize relay coil 103, which in turn moves the switch arm 104 between contacts 105 and 106. When said arm 104 is in contact with 106, a current from a source of polarization voltage flows in coil 101 and in a manner well known in the prior art causes a statistically sufficient fraction of the protons of the sample to polarize themselves in a direction such that they are oriented for maximum induction of the Larmor frequency into coil 101 as soon as switch arm 104 is switched away from contact with 106 allowing precession to begin. When arm 104 makes contact with 105, the "read" half of the "polarize-read" cycle begins. Capacitor 107 is selected so as to produce substantial parallel resonance in cooperation with coil 101 at the expected Larmor frequency. Since the said Larmor frequency is a function of the field strength to be measured, the value of capacitor 107 would be variable if the instrument were intended for measuring magnetic fields of various strengths.

A signal amplifier 108 provides sufficient gain such that the resultant signal out of limiter 109 is a steep sided square wave. This output square wave is accordingly constant in amplitude notwithstanding amplitude variations in the Larmor frequency signal from coil 101. The frequency of the output signal 110 is then evaluated by means of cycle counting techniques. The switch function generator may be a multivibrator or other relaxation oscillator circuit, or may be a mechanical cycling device.

Referring now to FIGURE 2, the synchronous polarization feature of the present invention will be described.

The functions of proton sample 200, coil 201, relay 203, switch elements 204, 205, and 206, capacitor 207, signal amplifier 208, and limiter 209 are all essentially as described in connection with elements 100, 101, 103, 104, 105, 106, 107, 108 and 109 respectively from FIGURE 1.

Realizing that the proton sample in any proton precession magnetometer must be fully repolarized after each read period, one of the limitations on the available read time for the instrument becomes obvious. When the instrument is being used as a magnetic anomoly detector, such as when it is moved over land or water to locate disturbances in the otherwise uniform pattern of the earth's magnetic field caused by buried or submerged metallic deposits or objects, this loss of read time becomes an important prior art limitation. Successive repolarizations tend to destroy whatever alignment was effected by the previous polarization, with consequent variation in the statistical proportion of the protons which assume alignments useful during the precession (read-out) period. This occurs because the polarization field is applied with no correlation to the position of the precessing protons. If the polarization field is applied the instant the "group position" of the precessing protons is at a maximum angle to the polarization field, maximum time is required to align these protons. When the polarization field is applied at the instant the precessing protons are most nearly aligned with the polarization field minimum time is required for alignment. The strength of the precession signal in prior art instruments varies at random between successive read-out cycles because of the above mentioned non-synchronous polarization.

In understanding this synchronous polarization concept, it is helpful to refer to the gyroscopic top analogy. For this purpose a reference to FIGURE 3 is helpful. Such a top precesses under the influence of the gravitational field and will return once each precession cycle to the position it had the instant the force causing the precession was applied, or to the position of constraint from which it was released and allowed to precess.

In the case of the precessing hydrogen proton under the influence of the earths field, a voltage is induced into coil 201 (which initially carfried the current which resulted in the alignment or polarization field). The instantaneous angle of the statistically average proton magnetic moment in respect to the axis of the polarization coil is measurable as a function of the instantaneous voltage induced in the coil. Stated otherwise, the precession signal is a function of the instantaneous angle deviation of the spin axis of the portion from the position of polarization alignment. Bearing in mind that the said proton spin axis returns to the said "zero deviation" angle with respect to its polarized position once each cycle, it will be realized that application of successive repolarizations at this opportune time will minimize the reorientation required of the protons and therefore reduce the repolarization time and power required.

A glance at FIGURE 3, which is largely self explanatory will be helpful in understanding this concept.

The precession signal itself, since it describes the spin axis orientation of the protons continuously, provides the basis for establishing the opportune time for initiation of repolarization.

Referring again to FIGURE 2, the energization of relay coil 203 to pull switch arm 204 into contact with 206 actually initiates repolarization. A fast, stable relay is important to the realization of the advantages of the invention feature now being described.

The actual implementation of the synchronous polarization concept is subject to considerable variation in circuit arrangement, however a simple approach is illustrated at FIGURE 2.

The amplified and limited Larmor signal 219, in addition to being forwarded to precise frequency measuring circuits on line 210 is also differentiated by feeding it through a capacitor 211 into the primary of a pulse transformer 212 (213 and 214 constitute the core and secondary respectively of the said transformer). Capacitor 211 is of such a value as to form a time constant in cooperation with the primary 212 which is short compared to a half cycle of signal 219. Whatever impedance matching into the triggered multivibrator 202 is necessary may be provided by selection of the primary-to-secondary ratio of the transformer. The multivibrator 202 may include semi-conductor (solid state) elements or may be instrumented with vacuum tubes and thus present different impedance matching requirements.

Diode 215 reduces the bipolar differentiated precession signal 216 to unipolar form 217, a step which is desirable for certain configurations of the multivibrator 202.

The said multivibrator 202 is designed to free run at a frequency corresponding roughly to the polarize/read cycle desired (not necessarily time symmetrical on both half cycles). At a time just prior to the self initiation of a new polarization cycle by the multivibrator 202 caused by its own free running time constants, a particular trigger pulse in the 217 pulse train will initiate the multivibrator flip and the beginning of the polarization cycle. The phase adjustment 218 in cooperation with the inductance of the relay coil 203 establishes an $L/R$ time constant which delays the closing of the relay points 204 and 206. This delay is adjustable and ideally would be set at a small even multiple of the half cycle of the precession frequency thereby to catch the protons on their next axis precession cycle or one of the following cycles at the time of return, to the instantaneous polarization alignment orientation as outlined hereinbefore.

As a practical matter, an error on the order of ten degrees in applying the new polarization cycle each time has been found to be unimportant and even larger errors may be tolerable. If polarization is applied for the comparatively short intervals as compared to the polarization decay or deterioration rate as made possible by this invention, the proton sample is polarized progressively more effectively each cycle until, after a number of cycles, the polarization approaches that attainable with infinitely long application of the polarization field at the average polarization power in use. Thus, the ultimate degree of average polarization effectiveness becomes a function, not of the length of the polarization half cycles themselves, but of the average polarization power.

In practice it has been possible to increase the data rate of the instrument from approximately one polarize/read cycle per second to ten such cycles per second without suffering any deterioration of signal-to-noise ratio resulting from deterioration of polarization adequacy. Further increases in data rate, although possible were not experimentally investigated, since at ten readings per second only half of the read period would be available in a relay instrumented device in view of mechanical operation times and transient settle-down times. The use of solid state switches is conceivable, and under such circumstances, the data rate could be advanced much further.

Since, with this synchronous polarization technique in operation, only a small aligning force is exerted each repolarization cycle, polarization and hence signal level, build up over a number of cycles initially.

Depending upon the application, the choice is available of minimizing polarization power (possibly most important for a portable or remote unattended unit) or maximizing the sensitivity, data rate and signal-to-noise ratio. As a practical example, it was determined in one experimental model that for a polarize/read cycle of 0.5 sec./0.5 sec., and a particular proton sample and polarization coil design, the same signal-to-noise ratio was achieved with 18 watts of average polarization power as was obtained with 72 watts when this synchronous polarization technique of the present invention was not used.

When the full advantage of the hereinabove described synchronous polarization technique is sought, certain other limitations of the basic prior art instrument circuitry tend to limit the exploitation of the advantages afforded by the said synchronous polarization.

Another feature of the present invention which contributes to the overall improved magnetometer system of the present invention is referred to as "gated coherent phase reference oscillator".

As will be appreciated from a study of the prior art, it is common to employ pulse or cycle counting techniques to maximize the accuracy of measurement of the Larmor frequency and therefore the accuracy of measurement of the unknown magnetic field.

The use of such counting techniques, often against a standard frequency source, introduces a significant loss of time in that during read (precession), time must be devoted to allowing transients to die out as in U.S. Patent Re. 23,796. Or as in U.S. Patent 3,070,745, there is a similar reading time loss plus an additional delay due to the finite lock-on period required for the phase lock loop used to lock-on and stabilize. Furthermore, the requirement for the reference oscillator to lock-in anew during each read period seriously limits the degree of data filtering possible.

In the improvement feature of the present invention concerning the use of a gated phase coherent reference oscillator, the lost or dead time during the read half cycle is practically eliminated by first sensing the decay of current in the polarizing coil in such a manner that a synchronizing pulse is generated at a time very closely related to the time of start of the precession or Larmor signal. In a phase-lock loop system this synchronizing pulse is used to reset the cycle counter which counts the reference oscillator frequency down to the Larmor frequency. In this way, the stable regulated reference oscillator can free run during the polarize half cycle, be phase-locked during the read period and still be phase coherent with the precession signal at the start of each new read period. Thus the prior art lock-in delay is eliminated.

For a more detailed explanation, reference is now first made to FIGURE 4, which depicts a prior art phase-lock loop system for a magnetometer of the proton precession type.

Again, elements 400 to 408 inclusive perform substantially those functions which their 100 and 200 series counterparts in FIGURES 1 and 2 perform. Basically this type of system functions as a frequency tracking system which must be fully locked and settled before the data on line 417 to an external counter can be regarded as "good," even though a start signal was sent to the external frequency meter on line 416 by the closing of switch contacts 414 and 415 at the beginning of the read period. A source of such a "sync" or start signal on line 416 is represented for convenience simply as a battery 418. At the time of closing of contacts 404 and 405 for the beginning of the read period, the Larmor frequency at the output of 408 is fed to a phase detector, it being assumed (although not as a requirement) that a limiter has operated within 408 so that the waveform presented to phase detector 409 is the same as that supplied by the counter 413 which delivers a substantially square wave of frequency counted down from the Voltage Controlled Variable Frequency Oscillator. Said controlled oscillator operates at a frequency which is a multiple of that supplied by the counter 413 to the phase detector 409.

The output of the phase detector 409 is smoothed somewhat by resistor 410 and capacitor 411 so that the output at their junction is a relatively smooth direct current voltage which may be positive or negative with respect to some predetermined voltage which controlled at some nominal frequency, which, when divided down by counter 413, approximates the expected Larmor frequency from 408.

Thus, the phase detector 409 and the filter elements 410 and 411 together with the voltage controlled VFO 412 and counter 413 constitute a feedback loop not unlike automatic frequency control in a frequency modulated device. The output of 412 provides (after lock-on and settle-down) a frequency on line 417 which may now be externally metered as a factor proportional to the unknown magnetic field intensity in response to which a particular Larmor frequency is produced.

Figure 5:
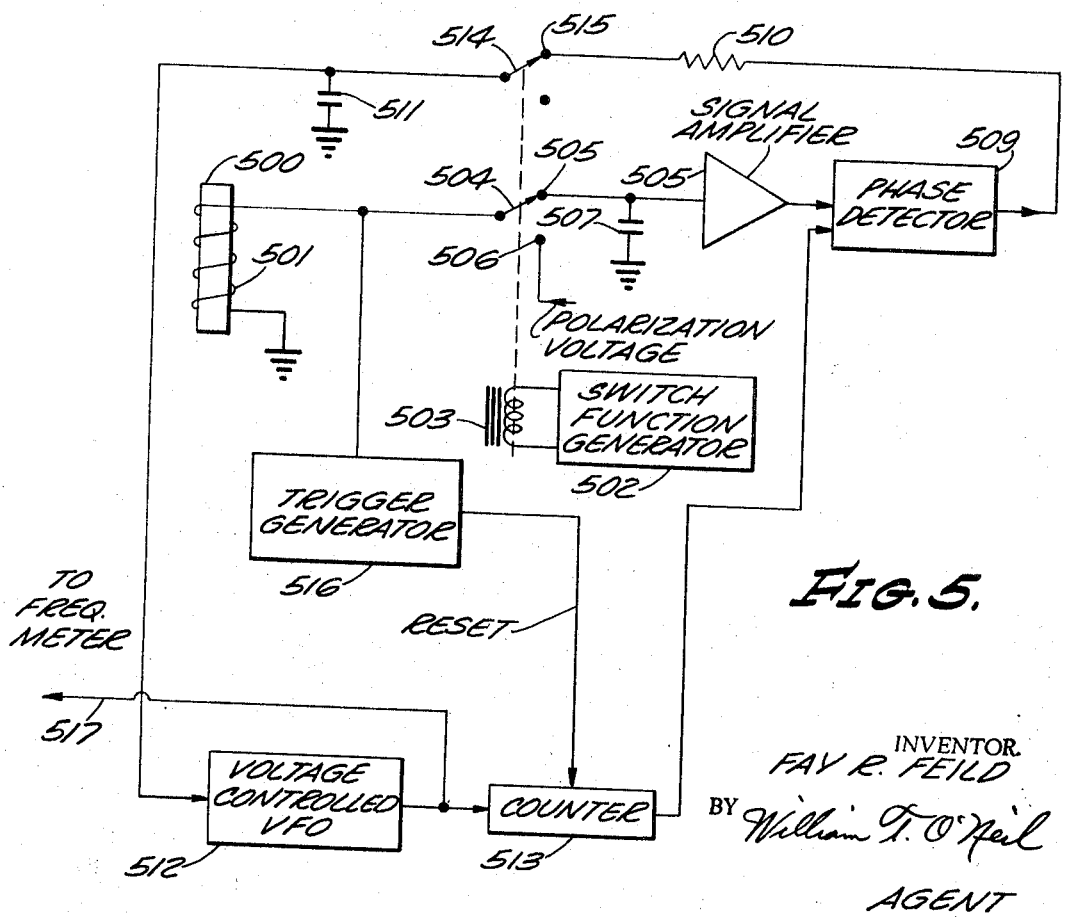
FIGURE 5 is a block schematic of a gated phase coherent phase lock magnetometer.

Referring now to FIGURE 5, the improved tracking loop (gated phase coherent reference oscillator) feature of the present invention will now be described in detail.

Again, elements 500 to 509 inclusive perform the same functions as their counterparts in the 400 symbol series depicted in FIGURE 4.

The most significant aspect of the FIGURE 5 configuration as compared to FIGURE 4 is that the reference oscillator count-down circuit is reset phase coincident with the start of the precession signal thus producing a reference signal at the precession (Larmor) frequency which is initially in phase with the precession signal itself. Thus the phase lock loop need only correct for the phase error which accumulates in the approximately 25 milliseconds between the reset trigger and die-out of transients, after which good data is gated to the phase detector. Thereafter it operates to track the precession signal in frequency.

Another significant difference of the FIGURE 5 configuration as compared to FIGURE 4 is in the filtering of the phase detector 509 output. A resistor and capacitor 510 and 511 may constitute a substantially greater time constant than was permitted in filtering the output of 409. In those applications where the field being measured does not change more than an amount corresponding to 180 degrees or more in phase shift during the read period (typically 20 gammas for a one-half second read period), the filter time constant may be made many times the polarize/read periods.

It will be noted that in the read position of relay 503, terminals 514 and 515 are in contact, however, capacitor 511 "remembers" the last value from the previous read cycle through the intervening polarize period. An isolation circuit between 511 and the VFO 512 performs the function of a vacuum tube cathode follower (i.e. a high impedance grid circuit to 511 so as not to appreciably discharge 511 while providing a low impedance drive for the VFO 512) may be necessary. During the time the contacts 514 and 515 are closed the capacitor is driven by the phase detector output 509 and "learns" new values immediately. These new values correspond to changed values of the Larmor frequency requiring the frequency control loop to assure a new frequency needed to bring the phase detector back to an output balance.

During the next polarization cycle, the memory of capacitor 511 maintains the VFO 512 at the same frequency as it was at the end of the previous read period, since 514 and 515 are now disconnected by relay 503, and so on repeating these steps through successive cycles.

It will be noted that the voltage controlled variable frequency oscillator 512 requires very little settle time as the frequency tracking loop merely picks up and makes relatively minor adjustments at the beginning of each read period. Since the reference oscillator is either on a multiple of the last precession frequency, moving to a multiple of the current precession frequency or in steady state tracking of the precession frequency which is not changing from cycle to cycle, the frequency measurement may be made at any time during the polarization period as well as during the read period. Integration over several cycles at a time is also an available technique.

The only additional requirement for the functioning of the reference oscillator is the reset trigger to counter 513. Said trigger is generated by 516, a circuit which senses the decay of the polarization field by measuring the back EMF from 501 and delivers its trigger at the predetermined time in relation to decay of the said field corresponding to the proximate beginning of precession under the influence of the field to be measured.

The foregoing description of the imvproved phase lock and track technique of the present invention assumes that the previously described technique of synchronous polarization described in connection with FIGURE 2 is also a part of the improved instrument of the present invention, however for clarity the elements of both features have not been included in any one figure of the drawings.

It will be noted in connection with FIGURE 5 that no need exists for a data-good or sync. pulse to the external frequency meter associated with output 517. This is because of the continuous operation of VFO 512 at a current or remembered frequency, which remains "good" as of the last previous reading and is subject only to relatively minor correction because of the small opportunity for significant change in the field to be measured during the cycle-to-cycle period.

The trigger generator 516 will be described in more detail in connection with FIGURE 7.

Figure 6:
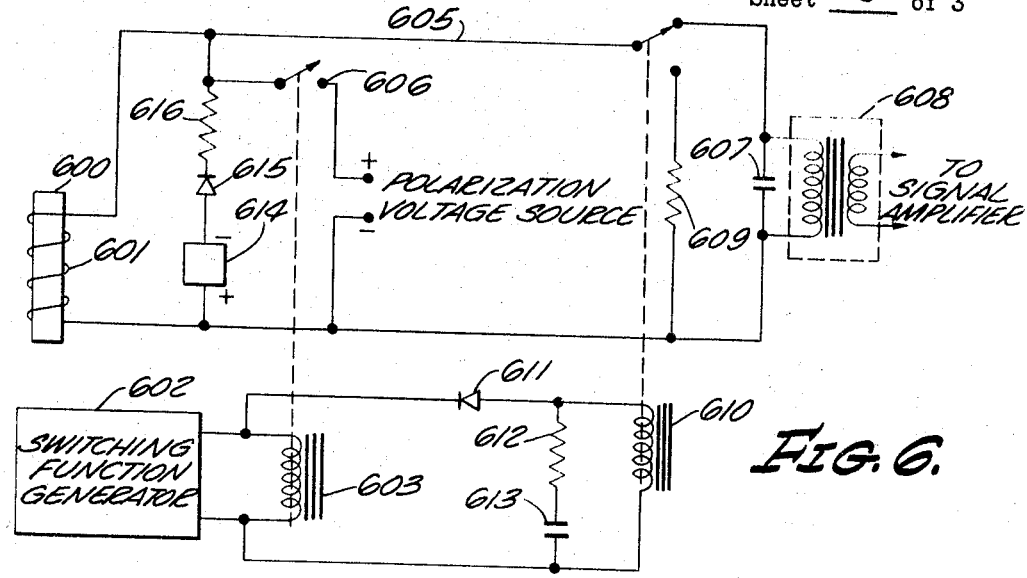
FIGURE 6 is a simplified schematic illustrating the improved polarization current keying technique of the present invention.

Referring now to FIGURE 6, an additional feature of the present invention is shown relating to improved breaking of the polarization current. This improvement is yet another feature related to the synchronous polarization technique of FIGURE 2 in that it aids significantly in exploiting the additional read time made available by the synchronous polarization and gated coherent reference oscillator features.

In prior art proton precession magnetometers, the problem of breaking an inductive load constituting the polarization coil in a short time has always been recognized. Back EMF damping resistors and diodes, if selected for the prevention of relay point arcing, overdamp the circuit causing slow current decay in the polarize coil. Due to the inevitable non-uniformity of the polarization magnetic field through the proton sample, the decay is such that various parts of the sample pass through the threshold of precession at differernt times. The resulting phase differences among the component precessing protons produces random precession phasing and a net loss of signal amplitude. Accordingly, rapid break of polarization current is important in order to minimize these phase differences.

Critical damping by appropriate selection of the damping resistor permits the build-up of excessive back EMF with resultant relay point arcing and the hazard of insulation breakdown, both of which are particularly troublesome in marine environments. Still further, since the arc time is large compared to permissable precession signal measurement errors, decay of the polarization current cannot be reliably used to mark the start of precession when the arcing variable is present.

In FIGURE 6, the components 600 through 604, 606 and 607 function as their counterparts in the 500 series of FIGURE 5.

The contacts of relay 603, which is a power handling type, no longer simply signal switch between polarize and read, but rather make and break the polarization current as in previous illustrations. A lead 605 connects the coil to the arm of a second (signal type) relay. Relay 603 must open very quickly and to be useable with the gated phase coherent oscillator system must operate without arcing or must arc in a highly repeatable manner.

The parameters of damping resistor 616 and diode 615 are selected such that the back EMF from 601 at the time of break of 604 and 606 contacts is damped such that the maximum fly-back voltage is less than the rated capability of the contacts 604 and 606 during the opening process of relay 603. Fast acting relays particularly adaptable to this operation are the mercury wetted reed types.

A battery or other back bias source 614 causes the diode 615 to cease conducting as soon or just short of the point at which the polarization field (as indicated by the instantaneous back EMF value from coil 601) decay has reached the point corresponding to the commencement of precession in the field to be measured. Actually, most applications envolving this type of magnetometer concern the measurement of earth-like field intensities or anomalies therein, so the expected point of precession is empirically determinable. Of course, the said bias value from 614 could be adjustable and therefore adaptable to a broad range of field strength measurements.

At this point it should be stated that the relay 610, being of the signal type (as contrasted to the somewhat slower acting power type), closes first in response to the action of 602 and opens later than power type 603 due to the constants 612, 613 and the hold-off diode 611 which prevents the coil of 603 from interacting with 610. In this way, a predetermined period of delay in opening relay 610 when 603 opens keeps resistor 609 "on the line" to continue to damp the back EMF of 601, which by the time of opening of diode 615, has comparatively little remaining flyback energy to be disposed. The value of resistor 609 affords critical damping for the remainder of the flyback time. This final damping is critical in terms of the self resonant frequency of the polarization coil (since capacitor 607 is not in the circuit until relay 610 opens) and therefore produces a rapid final decline of the flyback waveform. Looking ahead to FIGURE 8(a), the inflection point 802 defines this point of detachment of diode 615. It will be noted that the remaining decay is rapid and passes through the threshold of precession sharply.

The transformer coupling 608 provides a convenient way of extracting the signal with direct current continuity.

In selecting resistor 616 in practical cases, the flyback EMF was held to 250 volts maximum, this value being consistent with the use of highly reliable, repeatable and fast acting mercury relays. It should be pointed out that the rise of back EMF from a practical inductor in which the direct current flow is broken, is modified by capacitances present. From the theory of pure inductors, the said back EMF is $-L\,di/dt$ and therefore dependent only upon the rate of relay point breaking. In the present instance the cable capacitance and coil distributed capacitance limit the steepness of the back EMF waveform rise, a fact which permits the mercury relay to break the current without arcing.

By sensing the current in the damping circuit elements 514, 515 and 516, a trigger may be generated which defines the start of precession signals within 1/10 gamma of the unknown field, in a stable repeatable manner. The trigger generator of 516 is preferably of this type.

Figure 7:
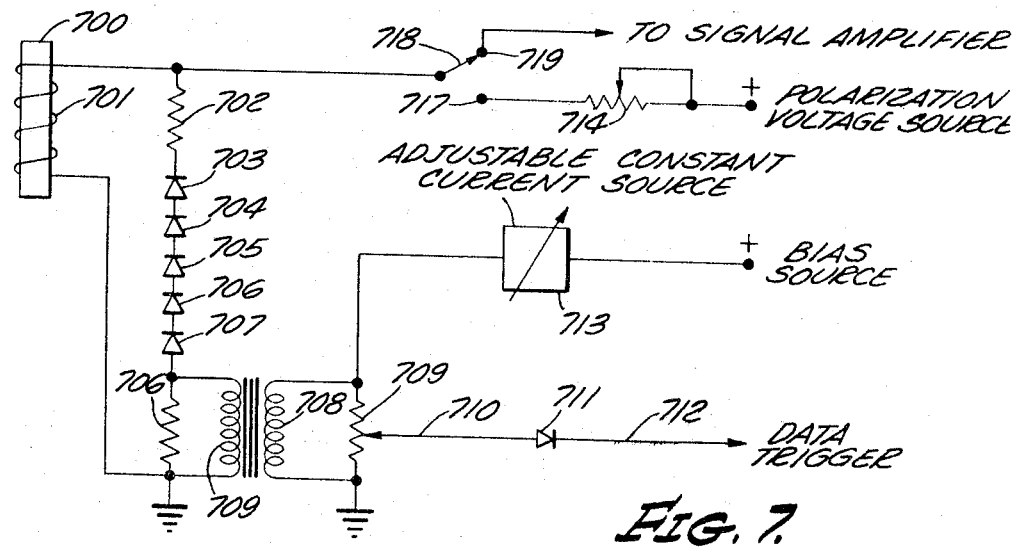
FIGURE 7 is a schematic of the precession period trigger generator of the present invention.

A detailed schematic of one circuit for generating the said data or reset trigger (516 in FIGURE 5) is depicted in FIGURE 7.

In this circuit, the proton sample is again represented as 700 and the polarize/read coil as 701. Although the relay coil is omitted, the polarize/read contacts are shown with contact made from 718 to 717 representing polarization current on (i.e. the polarize period), the circuit including adjustment resistor 714. When contact 719 is connected to 718 in lieu of 717, the signal or read period is in effect.

The heart of this particular circuit is the saturable core transformer having windings 708 and 709 through which a constant bias current flows from an adjustable (but constant at the selected value) current source 713. The bias current is sufficient to saturate the transformer core initially.

A fraction of the flyback energy flowing through resistors 702 and 706 and diodes 703 through 707 (which diodes provide a biasing action due to their inherent contact potential in lieu of a battery as at 614) drives the transformer out of saturation and on into saturation in the opposite direction. As the decay of the flyback proceeds, the point of detachment of diodes 703 through 707 occurs and the decay of the polarization field is accelerated as hereinbefore explained.

Figure 8:
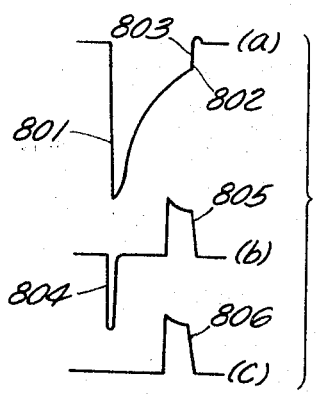
FIGURE 8 illustrates the typical waveforms at selected points in the circuit of FIGURE 6.

At this point in the description it would be helpful to refer to FIGURE 8 in connection with the further discussion of FIGURE 7. The (a) waveform of FIGURE 8 describes the current waveform as, for example, through resistor 702. The waveform 801 occurs during build-up of the back EMF from coil 701, and the knee 802 occurs corresponding to detachment of the first stage of damping and changeover to critical damping for the final absorption of the polarization field flyback energy as hereinbefore described.

In FIGURE 8(b) the two pulses 804 and 805 correspond to the steep passage of the 801 waveform driving the transformer out of saturation and the final flyback decay 803 respectively. The potentiometer adjustment 709 acts as a trigger amplitude control and lead 712 conveys the FIGURE 8(b) waveform to diode 713 which removes the 804 pulse leaving the 806 pulse of FIGURE 8(b) on output 712 (the data or reset trigger).

Variable resistor 714 is used for alignment purposes only. The precession signal cannot actually be said to start at any point in the decay of the polarization current, however, a point in this current decay can be selected which quite accurately represents the phase of the actual precession signal. To find this current point empirically variable resistor 714 is varied back and forth continuously thus changing the amount of energy contained in the flyback pulse which in turn slightly varies the time between break of current 801 and start of precession 803. While this is occurring the constant current source 713 is adjusted until a value is found at which there is little or no change in trigger phase with respect to the precession signal itself.

Many modifications and variations on the inventive concepts herein described will suggest themselves to the reader skilled in the art. It is not intended that the scope of the invention should be limited by the drawings or description. Both drawings and description are intended to be illustrative only.

The concepts described are to be understood to be adapted to instrumentation with either vacuum tube circuits or transistors and other semi-conductor devices. Where relays are shown, it should be understood that the ever advancing solid state art is gradually making possible the instrumentation of these functions in all electronic (no moving part) equivalents.

In accordance with the basic concepts of the invention, what is claimed is:

1. A precession type magnetometer comprising the combination of: A proton sample exposed to the field to be measured; a magnet coil located with respect to said sample such that, in response to a polarization current in said coil, a magnetic polarization field is generated through said sample at an angle with respect to said field to be measured; a frequency measuring circuit for measuring the frequency of the signal induced in said coil as a result of precession of said protons; means for alternating switching said coil between a source of said polarization current and said frequency measuring circuit thereby to produce a recurring cycle of polarization and read periods; means within said frequency measuring circuit comprising a variable frequency oscillator for generating a frequency which is a function of an applied oscillator control signal; counting means responsive to the output of said oscillator for dividing the output frequency thereof to permit said oscillator to operate at a multiple of said induced signal frequency, said counting means including a digital counter having an output stage which changes output state at a rate which is a sub-multiple of said oscillator frequency; detector means responsive to said counter output and said signal induced in said coil for comparing the phase of said induced signal with the phase of said counter output to generate said oscillator control signal; means for smoothing and storing the value of said oscillator control signal over a plurality of said recurring cycles, thereby to substantially preserve the frequency of said oscillator during said polarization periods; means responsive to a trigger for reset of said counting means substantially at the beginning of each of said read periods; and means for generating said trigger, including a threshold circuit responsive to the decay of said polarization current at the end of a polarization cycle, said threshold circuit also being adapted to increase the rate of decay of said polarization current during the final stage of the decay process to provide a rapidly changing function from which said threshold circuit controls the generation of said trigger in a closely repeatable phase relationship to the initial commencement of precession within successive read periods.

2. The invention set forth in claim 1 further defined in that said threshold circuit means includes diode means connected in a shunt circuit across said coil for breaking said polarization current in a highly repeatable manner by utilization of the sharply non-linear forward current versus applied voltage characteristic of a series of at least one solid state diode within said diode means, and impedance means are included in series with said diode means for sensing a predetermined point in said decay to develop a voltage signal for operating said triggering means.

References Cited

UNITED STATES PATENTS 3,070,745  12/1962  Serson _____ 324—0.5
3,256,477  6/1966  Gautier _____ 324—0.5

RUDOLPH V. ROLINEC, *Primary Examiner.*

MICHAEL J. LYNCH, *Assistant Examiner.*